United States Patent
Yoon et al.

(10) Patent No.: US 11,018,574 B2
(45) Date of Patent: May 25, 2021

(54) VOLTAGE CONVERTER WITH EMBEDDED SNUBBER FOR SUPPRESSING SWITCHING HARMONICS

(71) Applicant: SAMSUNG ELECTRONICS CO., LTD., Suwon-si (KR)

(72) Inventors: Jehyung Yoon, Seoul (KR); Dongjin Keum, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/576,562

(22) Filed: Sep. 19, 2019

(65) Prior Publication Data
US 2020/0266701 A1 Aug. 20, 2020

(30) Foreign Application Priority Data
Feb. 15, 2019 (KR) .......................... 10-2019-0017849

(51) Int. Cl.
*H02M 1/34* (2007.01)
*H02M 3/158* (2006.01)

(52) U.S. Cl.
CPC .............. *H02M 1/34* (2013.01); *H02M 3/158* (2013.01); *H02M 2001/348* (2013.01)

(58) Field of Classification Search
CPC ..... H02M 2001/348; H02M 2001/344; H02M 1/34; H02M 3/158
See application file for complete search history.

(56) References Cited

U.S. PATENT DOCUMENTS

| | | | |
|---|---|---|---|
| 8,059,437 B2 | 11/2011 | Yamada | |
| 8,890,453 B2 | 11/2014 | Kure | |
| 9,236,789 B1* | 1/2016 | Li | H02M 3/158 |
| 2008/0137379 A1* | 6/2008 | Mao | H02M 3/33515 363/17 |
| 2009/0102542 A1* | 4/2009 | Reynolds | H03G 1/0088 327/478 |
| 2010/0163950 A1* | 7/2010 | Gladish | H01L 29/7835 257/302 |
| 2012/0049834 A1 | 3/2012 | Pommerenke et al. | |
| 2013/0127539 A1* | 5/2013 | Murakami | H01L 27/1203 330/277 |
| 2013/0334599 A1* | 12/2013 | Pan | H01L 29/7805 257/337 |
| 2014/0077778 A1* | 3/2014 | Sato | H01L 29/407 323/282 |
| 2014/0284781 A1* | 9/2014 | Asaoka | H01L 23/49537 257/676 |
| 2017/0346306 A1 | 11/2017 | Jung et al. | |

FOREIGN PATENT DOCUMENTS

| | | |
|---|---|---|
| JP | 2006-352942 A | 12/2006 |
| JP | 2017-204950 A | 11/2017 |
| JP | 2018-010965 A | 1/2018 |

* cited by examiner

*Primary Examiner* — Harry R Behm
(74) *Attorney, Agent, or Firm* — Volentine, Whitt & Francos, PLLC

(57) ABSTRACT

A voltage converter includes a switch controller controlling operation of first second transistors to generate an output voltage from an input voltage while suppressing harmonics generated by the operation of the first an second transistors, wherein the first transistor includes an embedded snubber including a first damping resistor.

20 Claims, 16 Drawing Sheets

VOLTAGE CONVERTER WITH EMBEDDED SNUBBER FOR SUPPRESSING SWITCHING HARMONICS

CROSS-REFERENCE TO RELATED APPLICATIONS

This application claims priority under 35 U.S.C. § 119 to Korean Patent Application No. 10-2019-0017849 filed on Feb. 15, 2019, the subject matter of which is hereby incorporated by reference.

BACKGROUND

Embodiments of the inventive concept relate to semiconductor devices and more particularly to voltage converters capable of suppressing harmonics that may occur due to transistor switching.

Many electronic device includes functional blocks that perform a variety of different functions. For example, the electronic device may include a processor that performs a general operations, a memory that stores data, a modem that communicates with an external device, an image processor that processes image data, etc. The electronic device may be integrated on one substrate or may be a system-on-chip (SoC) that is implemented with one semiconductor chip.

The functional blocks of the electronic device may perform relevant functions using different voltages. Accordingly, voltage converters are widely used to converts a given voltage (e.g., an input voltage) into a different voltage (e.g., an output voltage). Among voltage converters, a voltage converter that steps down the input voltage to generate the output voltage is called a buck converter, while a voltage converter that steps up the input voltage to generate the output voltage is called a boost converter.

Undesirable harmonics may be generated during the voltage conversion process. Harmonics are essentially noise signals that may stress certain components (e.g., transistors) of the voltage converter. Such stress degrades reliability and reduces the useful lifetime of the voltage converter.

SUMMARY

Embodiments of the inventive concept provide a voltage converter enjoying improved reliability and extended lifetime.

According to one exemplary embodiment, a voltage converter includes; an inductor connected between an output node at which an output voltage is apparent and a switch node, an output capacitor connected between the output node and a ground node, a first transistor connected between an input node receiving an input voltage and the switch node, a second transistor connected between the switch node and the ground node, and a switch controller configured to control the operation of the first transistor and the second transistor. The first transistor includes; a first gate terminal connected to the switch controller, a first source/drain terminal connected to the input node, a second source/drain terminal connected to the switch node, a first body terminal connected to the switch node, and a first substrate terminal connected to the ground node through a first embedded snubber including a first damping resistor.

According to another exemplary embodiment, a voltage converter configured to convert an input voltage to an output voltage using an inductor connected between an input node receiving the input voltage and a switch node, and an output capacitor connected between an output node at which the output voltage is apparent and a ground node. The voltage converter includes; a switch controller configured to control the operation of a first transistor and a second transistor in order to generate the output voltage from the input voltage while suppressing harmonics generated by the operation of the first transistor and the second transistor. The first transistor is connected between the switch node and the output node and the second transistor is connected between the switch node and the ground node, and the first transistor comprises a first gate terminal connected to the switch controller, a first source/drain terminal connected to the output node, a second source/drain terminal connected to the switch node, a first body terminal connected to the switch node, and a first substrate terminal connected to the ground node through a first embedded snubber including a first damping resistor.

According to still another exemplary embodiment, a voltage converter includes; an inductor connected between an output node at which an output voltage is apparent and a switch node, an output capacitor connected between the output node and a ground node, a first transistor connected between an input node receiving an input voltage and the switch node, a second transistor connected between the switch node and the ground node, and a switch controller configured to control the operation of the first transistor and the second transistor. The first transistor includes; a first gate terminal connected to the switch controller, a first source/drain terminal connected to the input node, a second source/drain terminal connected to the switch node, a first body terminal connected to the switch node, and a first substrate terminal connected to the ground node through a first embedded snubber including a first damping resistor, and a P-type substrate connected to the substrate terminal, an N-type well formed in the P-type substrate and connected to the ground node, a P-type body formed in the N-type well and connected to the first body terminal, a gate formed over the P-type body and connected to the first gate terminal, and a first N-type area and a second N-type area formed adjacent to the P-type body and respectively connected to the first source/drain terminal and the second source/drain terminal.

DETAILED DESCRIPTION

Certain embodiments of the inventive concept will be described in some additional detail with reference to the accompanying drawings.

Figure 1:
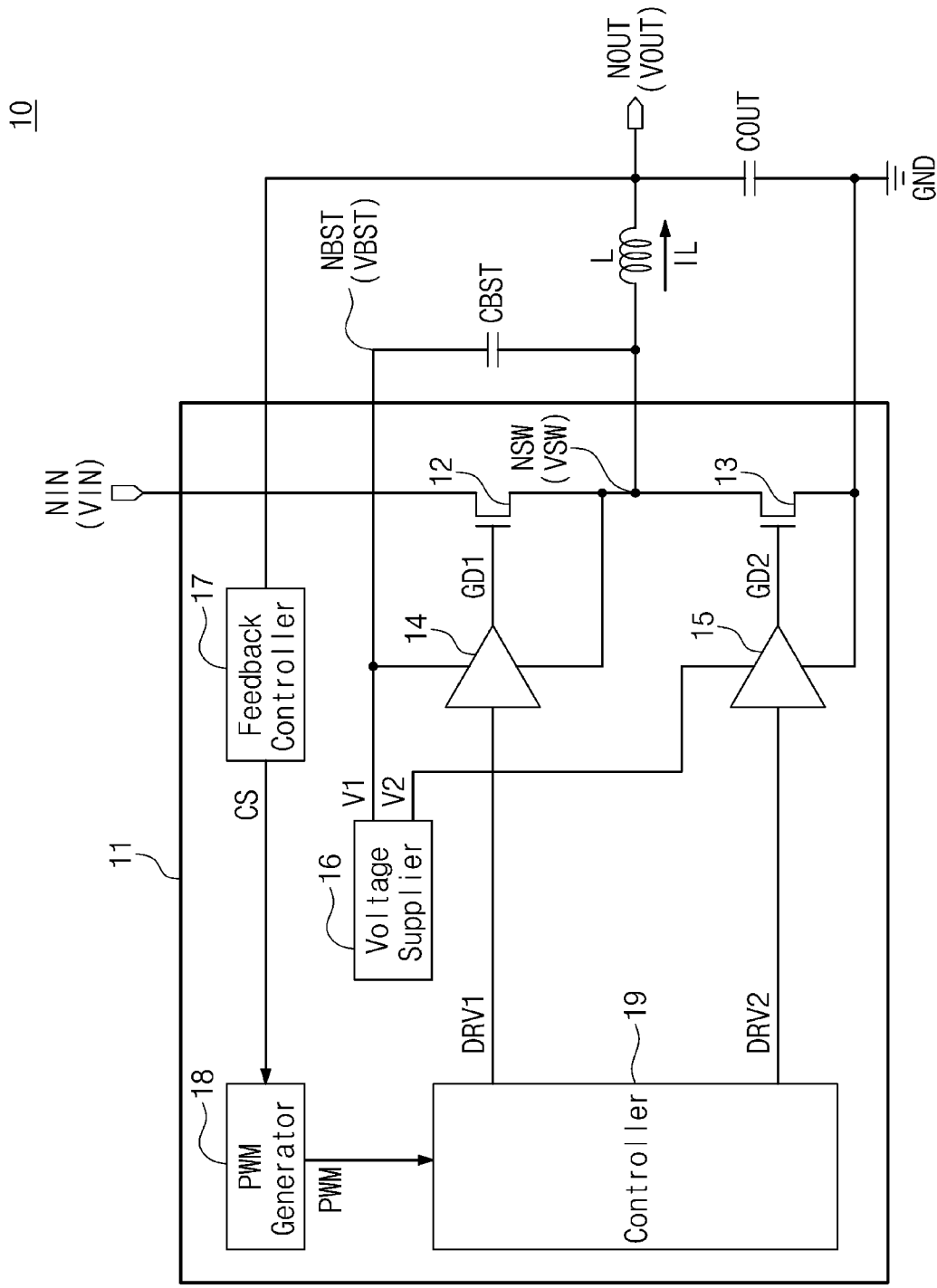
FIG. 1 illustrates a voltage converter.

Figure (FIG. 1 is a circuit diagram illustrating a voltage converter 10 comprising a first transistor 12, a second transistor 13, a first driver 14, a second driver 15, a voltage supplier 16, a feedback controller 17, a pulse width modulation signal (PWM) generator 18, a controller 19, an inductor "L", an output capacitor COUT, and a boost capacitor CBST.

The first transistor 12 is connected between an input node NIN, a node receiving an input voltage VIN, and a switch node NSW, where the gate of the first transistor 12 is controlled by the first driver 14. The second transistor 13 is connected between the switch node NSW and a ground node, a node connected to a ground voltage GND, where the gate of the second transistor 13 is controlled by the second driver 15.

The inductor "L" is connected between the switch node NSW and an output node NOUT, a node at which an output voltage VOUT is apparent. The output capacitor COUT is connected between the output node NOUT and the ground node. The boost capacitor CBST may be connected between the switch node NSW and the boost node NB ST.

In the illustrated embodiment of FIG. 1, the first driver 14 receives a boost voltage VBST provided at a boost node NBST as a first power input and a switch voltage VSW provided at the switch node NSW as a second power input. The first driver 14 receives a first driving signal DRV1 from the controller 19 and provides (or "outputs") a first gate driving signal GD1 to the gate of the first transistor 12 in response to the first driving signal DRV1.

Thus, when the first driving signal DRV1 is logically "high", the first driver 14 may output a high boost voltage VBST such that the first transistor 12 is turned ON. When the first driving signal DRV1 is low logically "low", the first driver 14 may output a low switch voltage VSW such that the first transistor 12 is turned OFF.

At this point, those skilled in the art will recognize that the logical level (i.e., high/low) assumptions set forth in the detailed description are merely illustrative. Assumed signal logic level(s) may be easily reversed in other embodiments making different assumptions regarding applied power voltage(s), driving signal level(s), and/or constituent component operating properties. For example, the illustrated embodiment of FIG. 1, assumes that the first transistor 12 is an N-type transistor. However, alternately assuming that the first transistor 12 is a P-type transistor, the high/low logic levels and/or associated driving and/or supply voltage levels described above would be reversed.

The second driver 15 receives a second voltage V2 supplied by the voltage supplier 16 as the first power input and the ground voltage GND as the second power input. The second driver 15 also receives a second driving signal DRV2 from the controller 19 and outputs a second gate driving signal GD2 to the gate of the second transistor 13 in response to the second driving signal DRV2.

Thus, when the second driving signal DRV2 is high, the second driver 15 outputs a high second voltage V2 such that the second transistor 13 is turned ON. When the second driving signal DRV2 is low, the second driver 15 outputs the ground voltage GND such that the second transistor 13 is turned OFF.

The voltage supplier 16 outputs a first voltage V1 and the second voltage V2. In certain embodiments, when the boost voltage VBST is lower than a reference level, the first voltage V1 may be supplied to the boost node NBST, and when the boost voltage VBST is lower than the reference level, a sum of the boost voltage VBST and the first voltage V1 may be provided as the first power input to the first driver 14. The second voltage V2 may be provided as the first power input to the second driver 15. Thus, the first voltage V1 and the second voltage V2 may be a respective power supply voltages.

The feedback controller 17 may be used to detect the level of the output voltage VOUT. Here, the feedback controller 17 may output a control signal CS, based on whether the output voltage VOUT is higher or lower than a target voltage. When the output voltage VOUT is higher than the target voltage, the feedback controller 17 may output the control signal CS such that the output voltage VOUT decreases, and when the output voltage VOUT is lower than the target voltage, the feedback controller 17 may output the control signal CS such that the output voltage VOUT increases.

The PWM signal generator 18 may be used to generate a PWM signal in response to the control signal CS. That is, when the control signal CS indicates an increasing output voltage VOUT, the PWM signal generator 18 may adjust (e.g., decrease) the pulse width of the PWM signal, and when the control signal CS indicates a decreasing output voltage VOUT, the PWM signal generator 18 may adjust (e.g., increase) the pulse width of the PWM signal.

The controller 19 receives the PWM signal, and generates the first driving signal DRV1 and the second driving signal DRV2 in response thereto, where the first driving signal DRV1 may be used to define ON/OFF intervals for the first transistor 12. Here, those skilled in the art will recognize that ON intervals and OFF intervals for the first transistor 12 may be defined in accordance with high/low logic levels or low/high logic levels. Analogously, the second driving signal DRV2 may be used to define ON/OFF intervals for the second transistor 13.

In certain embodiments, the first transistor 12, second transistor 13, first driver 14, second driver 15, voltage supplier 16, feedback controller 17, PWM signal generator 18, and controller 19 may be variously implemented on multiple semiconductor chips or a single semiconductor chip 11 (i.e., with an "on-chip" layout in relation to semiconductor chip 11). Further, at least one of the boost capacitor CBST, inductor "L", and output capacitor COUT may be implemented on-chip in relation to the semiconductor chip 11. However, one or more of the boost capacitor CBST, inductor "L", and output capacitor COUT may be implemented external to the semiconductor chip 11 (i.e., with an "off-chip" layout in relation to the semiconductor chip 11).

In certain embodiments, the combination of the first driver 14, second driver 15, voltage supplier 16, feedback controller 17, PWM signal generator 18, controller 19, and boost capacitor CBST may be collectively referred to as a "switch controller" configured to control the operation of the first transistor 12 and second transistor 13.

In the context of the illustrated example of FIG. 1, the voltage converter 10 may step down the input voltage VIN received by the input node NIN, and output the resulting stepped-down voltage as output voltage VOUT at the output node NOUT. Thus, the voltage converter 10 may operate as a buck converter.

Figure 2:
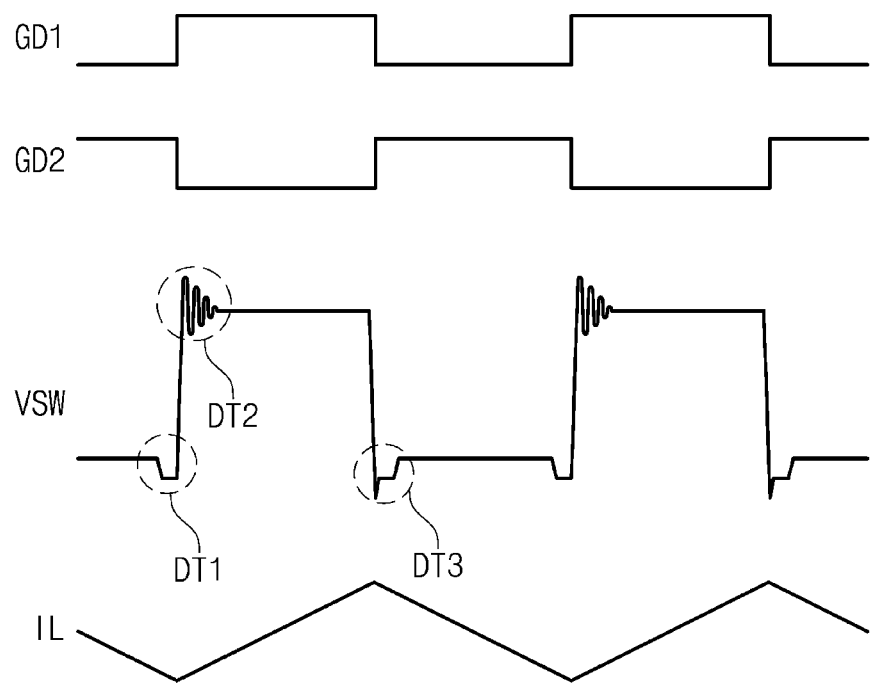
FIG. 2 illustrates waveforms associated with the voltage converter of FIG. 1.

FIG. 2 is a waveform diagram illustrating selected signals and signal relationships associated with the voltage converter 10 of FIG. 1.

For example, when the first gate driving signal GD1 is low, the first transistor 12 is turned OFF, and when the first gate driving signal GD1 is high, the first transistor 12 is turned ON. Likewise, when the second gate driving signal GD2 is low, the second transistor 13 is turned OFF, and when the second gate driving signal GD2 is high, the second transistor 13 is turned ON.

When the first gate driving signal GD1 is low level and the second gate driving signal GD2 is high, the first transistor 12 is turned OFF, and the second transistor 13 is turned ON. Under these conditions, the switch node NSW is connected to the ground node through the second transistor 13, the switch voltage VSW is a ground voltage, inductor current (IL) flows in relation to the output node NOUT as a function of electrical charge held by the inductor "L", and as the electrical charge gradually decreases, so too does the inductor current IL.

Thereafter, when the first gate driving signal GD1 transitions to high and the second gate driving signal GD2 transitions to low, the first transistor 12 is turned ON and the second transistor 13 is turned OFF. The switch node NSW is connected to the input node NIN through the first transistor 12, and the switch voltage VSW increases to the input voltage VIN.

In this case, electrical charge is accumulated by the inductor "L", inductor current (IL) flows in relation to the output node NOUT as a function of electrical charge held by the inductor "L", and as the electrical charge gradually increases, so too does the inductor current IL.

However, referring to FIG. 2, when the switch voltage VSW increases to the input voltage VIN, a first distortion DT1 and a second distortion DT2 may occur. That is, the first distortion DT1 may occur when the second transistor 13 is turned OFF, and the second distortion DT2 may occur when the first transistor 12 is turned ON. Here, at least the second distortion DT2 may include signal harmonics.

Likewise, when the first gate driving signal GD1 transitions to low and the second gate driving signal GD2 transitions to high, the first transistor 12 is turned OFF and the second transistor 13 is turned ON. The switch node NSW is connected to the ground node through the second transistor 13 and the switch voltage VSW decreases to the ground voltage. When the switch voltage VSW decreases to the ground voltage, the turn OFF of the first transistor 12 and/or the turn ON of the second transistor 13 may cause a third distortion DT3.

Here, the first distortion DT1, second distortion DT2, and/or third distortion DT3 may occur due to parasitic inductance and/or parasitic capacitance associated with the first transistor 12 and/or the second transistor 13.

Unfortunately, the occurrence of the first distortion DT1, second distortion DT2, and/or third distortion DT3 may variously stress the first transistor 12 and/or the second transistor 13, and as the voltage converter 10 continuously operates, these distortions may repeatedly stress the first transistor 12 and/or the second transistor 13. In particular, harmonics associated with the second distortion DT2 may act as Electro-magnetic Interference (EMI). AT a minimum, the repeated occurrence of the first distortion DT1, second distortion DT2, and/or third distortion DT3 adversely affects the reliability of the voltage converter 10 and reduces the overall operative lifetime of the voltage converter 10.

Figure 3:
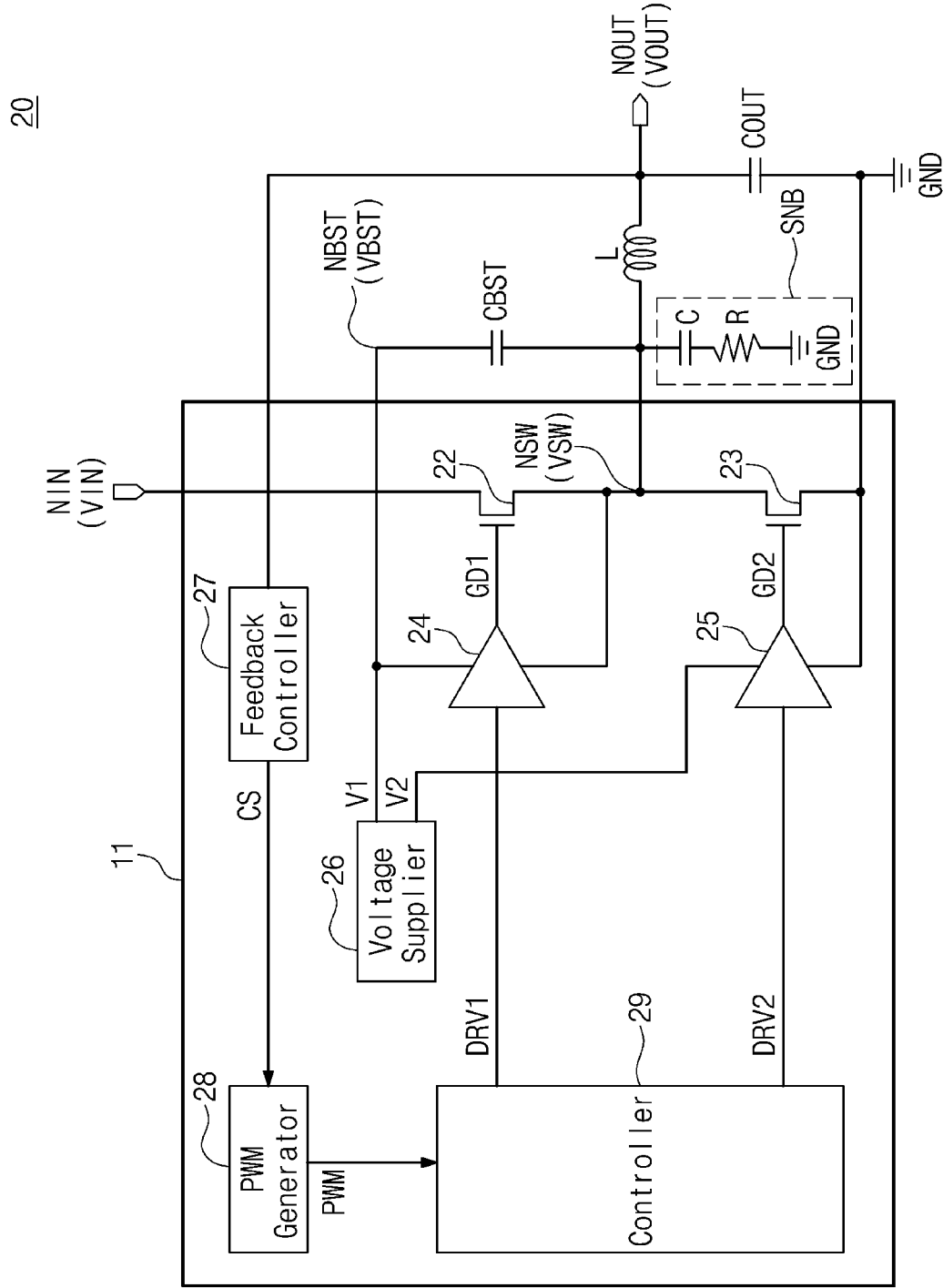
FIG. 3 illustrates a voltage converter according to another embodiment.

FIG. 3 is another circuit diagram illustrating a voltage converter 20. Here, analogous components are analogously labeled (1X verses 2X) between the comparative embodiments of FIGS. 1 and 3.

Thus, the configuration, connection and operation of a first transistor 22, a second transistor 23, a first driver 24, a second driver 25, a voltage supplier 26, a feedback controller 27, a PWM signal generator 28, a controller 29, an inductor "L", an output capacitor COUT, and a boost capacitor CBST of FIG. 3 may be the same as the configuration, connection and operation of the first transistor 12, second transistor 13, first driver 14, second driver 15, voltage supplier 16, feedback controller 17, PWM signal generator 18, controller 19, inductor "L", output capacitor COUT, and boost capacitor CBST described with reference to FIG. 1.

However, with respect to the voltage converter 10 of FIG. 1, the voltage converter 20 additionally comprises a so-called snubber circuit ("snubber" SNB) connected to the switch node NSW. In certain embodiments, the snubber SNB may include a series-connected capacitor "C" and resistor "R" connected between the switch node NSW and the ground node.

The capacitor "C" may be used to determine a resonant frequency together with a parasitic inductance and a parasitic capacitance associated with the first transistor 12 and second transistor 13. The resistor "R" may function as a damping resistor that consumes electrical energy associated with the harmonics such that oscillation of the switch voltage VSW apparent at the switch node NSW more rapidly decreases.

Hence, distortions of the switch voltage VSW may effectively be reduced or eliminated by connecting the snubber SNB to the switch node NSW. However, the provision snubber SNB and its connection to the switch node NSW may increase in the physical size and of the voltage converter 20 and drive up overall cost.

Instead of adding a snubber circuit, alternate approaches to decreasing the signal transition slope(s) of the first gate driving signal GD1 and/or the second gate driving signal GD2 may be used to reduce distortion(s) of the switch voltage VSW. However, these approaches require the additional provision and connection of components associated with the first driver 24, second driver 25, and/or controller 29. Here again, the physical size and/or cost of the voltage converter 20 may disadvantageously driven upwards.

Figure 4:
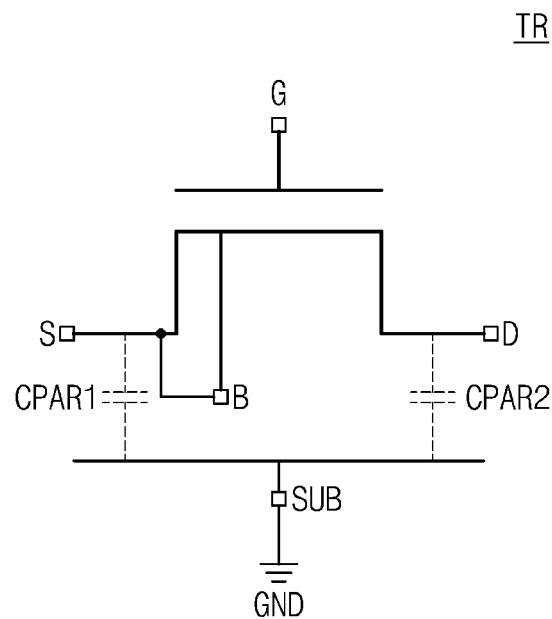
FIG. 4 illustrates examples of terminals of a transistor which is able to be used as a first transistor or a second transistor of a voltage converter.

FIG. 4 is a circuit diagram conceptually illustrating transistor TR terminals like those associated with the first transistor 12 or 22 and/or the second transistor 13 or 23 of the voltage converter 10 or 20 described above. Referring to FIG. 4, a transistor "TR" includes a gate terminal "G", a drain terminal "D", a source terminal "S", a body terminal "B", as well as a substrate terminal SUB. In certain embodiments of the inventive concept the "source" terminal and the "drain" terminal may be alternately referred to as a first source/drain terminal and a second source drain terminal that operate respectively as a source or drain terminal depending on the connected of the constituent transistor.

Here, it is assumed that an N-well is formed in a P-substrate—as further described with reference to FIGS. 9, 10, 11 and 12—and that the P-substrate is be connected to the substrate terminal SUB. The substrate terminal SUB is connected to a ground node at which the ground voltage GND is apparent such that the N-well is biased by the ground voltage GND.

A P-type body may be formed in the N-well, where the P-type body is connected to the body terminal "B". An N-type source and an N-type drain may be formed adjacent to the P-type body. The N-type source may be connected to the source terminal "S", and the N-type drain may be connected to the drain terminal "D". The source terminal "S" and the body terminal "B" may be connected in common.

A reserve bias N-P junction may exist between the source terminal "S" and the substrate terminal SUB and between the drain terminal "D" and the substrate terminal SUB. Accordingly, the source terminal "S" and the substrate terminal SUB are electrically separated from one another, and a first parasitic capacitor CPAR1 may exist between the source terminal "S" and the substrate terminal SUB.

Likewise, the drain terminal "D" and the substrate terminal SUB are electrically separated from one another, and a second parasitic capacitor CPAR2 may exist between the drain terminal "D" and the substrate terminal SUB.

Certain embodiments of the inventive concept recognize that a snubber may be implemented using the first parasitic capacitor CPAR1 and the second parasitic capacitor CPAR2 inherently apparent in the transistor TR. Thus, instead of providing and connecting additional, discrete capacitive and/or resistive components, as described in one example by the illustrated embodiment of FIG. 3, embodiments of the inventive concept may effectively implement a snubber using the first parasitic capacitor CPAR1 and the second parasitic capacitor CPAR2 of the transistor TR, thereby avoiding escalations in physical area and implementation costs.

Figure 5:
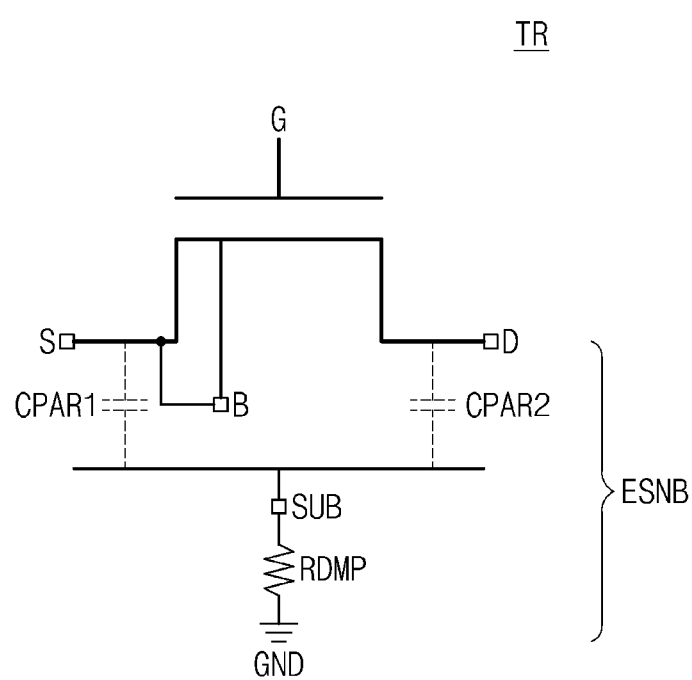
FIG. 5 illustrates an example of an embedded snubber implemented by using parasitic capacitors of a transistor.

FIG. 5 is another circuit further illustrating various approaches to the implementation of embodiments of the inventive concept, wherein an embedded snubber ESNB is provided by utilizing at least one parasitic capacitors CPAR1 and CPAR2 associated with at least one of the first transistor 12 or 22 and the second transistor 13 and 23 described above. In this regard, the term "embedded snubber" ESNB is used merely to distinguish the formerly described discrete snubber circuit. This term is intended for descriptive (or comparative) clarity and is not intended to limit embodiments of the inventive concept to particular implementation approaches.

Referring the transistor TR illustrated in FIG. 5, the substrate terminal SUB may be connected to a ground node through a damping resistor RDMP. Thus, the embedded snubber ESNB may be implemented in certain embodiments of the inventive concept using the damping resistor RDMP, the first parasitic capacitor CPAR1, and the second parasitic capacitor CPAR2.

Given the foregoing description and working examples, a center frequency for the harmonics to-be-suppressed by the embedded snubber ESNB may be determined using Equation 1 below:

$$f = \frac{1}{2\pi\sqrt{LC}} \quad \text{[Equation 1]}$$

In Equation 1, "f" is a center frequency of harmonics, "L" is a parasitic inductance associated with the transistor TR, and "C" is a parasitic capacitance associated with the transistor TR. For example, a sum of the first and second parasitic capacitors CPAR1 and CPAR2 described above may be used as the capacitance "C". In this manner, a center frequency for the harmonics to-be suppressed by the embedded snubber ESNB may be determined in relation to a parasitic inductance and a parasitic capacitance.

A power of the harmonics to-be-suppressed by the embedded snubber ESNB may be determined using Equation 2 below.

$$P = 10\log\left|\alpha\frac{\sqrt{R^2 + \left(\omega L - \frac{1}{\omega C}\right)^2}}{R}\right| \quad \text{[Equation 2]}$$

In Equation 2, "P" is an amplitude of the harmonics, "a" is a coefficient that depends on a process, "R" is a resistance value of the damping resistor RDMP, and "ω" is a value obtained by multiplying the frequency "f" of Equation 1 and "2 π" together. That is, when frequencies of harmonics to be suppressed are determined, a power of the suppressed harmonics may be determined in relation to a resistance value of the damping resistor RDMP.

Figure 6:
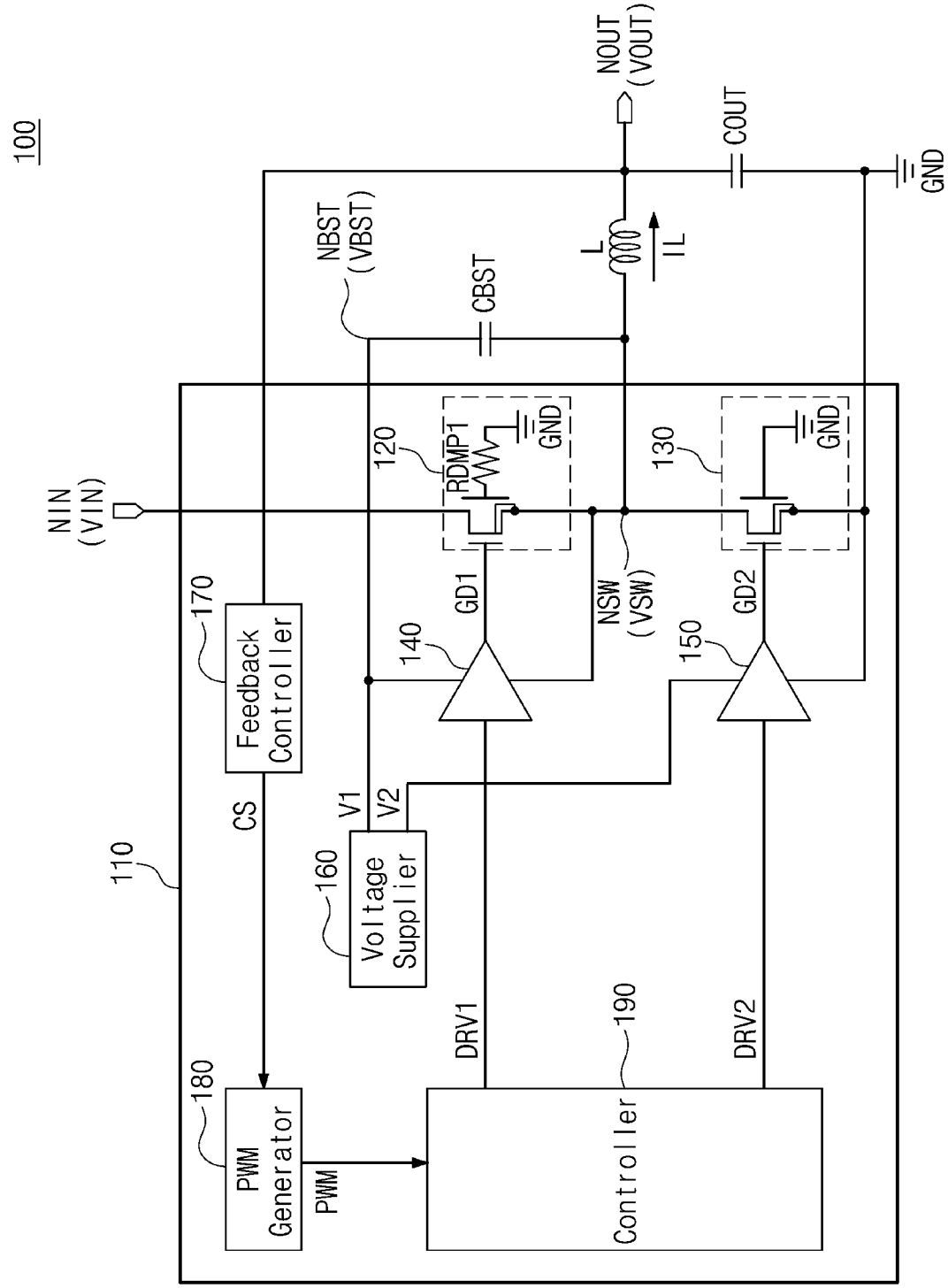
FIG. 6 illustrates a voltage converter according to an embodiment of the inventive concept.

With this conceptual description in mind, FIG. 6 is another circuit diagram illustrating a voltage converter 100 according to embodiments of the inventive concept. Here again, analogous components are analogously labeled (1X verses 1X0) between the comparative embodiments of FIGS. 1 and 6.

Thus referring to FIG. 6, the voltage converter 100 comprises a first transistor 120, a second transistor 130, a first driver 140, a second driver 150, a voltage supplier 160, a feedback controller 170, a PWM signal generator 180, a controller 190, an inductor "L", an output capacitor COUT, and a boost capacitor CBST.

The configuration, connection and operation of the first driver 140, second driver 150, voltage supplier 160, feedback controller 170, PWM signal generator 180, controller 190, inductor "L", output capacitor COUT, and boost capacitor CBST may be the same as the configuration, connection and operation of the first driver 14, second driver 15, voltage supplier 16, feedback controller 17, PWM signal generator 18, controller 19, inductor "L", output capacitor COUT, and boost capacitor CBST described above with reference to FIG. 1.

Here again, a switch controller may be similarly configured to control operation of the first transistor 120 and/or the second transistor 130.

However unlike the embodiment illustrated in FIG. 1, the first transistor 120 and the second transistor 130 may be respectively implemented consistent with the description and teachings associated with the embodiments described in relation to FIGS. 4 and 5. That is, a substrate terminal of the second transistor 130 may be understood as being connected directly to a ground node, and a substrate terminal of the first transistor 120 may be understood as being connected to the ground node through a first damping resistor RDMP1.

Thus, an embedded snubber ESNB may be implemented using the first damping resistor RDMP1 and a parasitic capacitance inherent to the first transistor 120, where the parasitic capacitance of the first transistor 120 may be associated with a frequency band of harmonics to-be-suppressed from among potential harmonics of the switch voltage VSW. With this configuration, the first damping resistor RDMP1 may effectively consume electrical energy associated with the harmonics, such that the harmonics are effectively suppressed.

Figure 7:
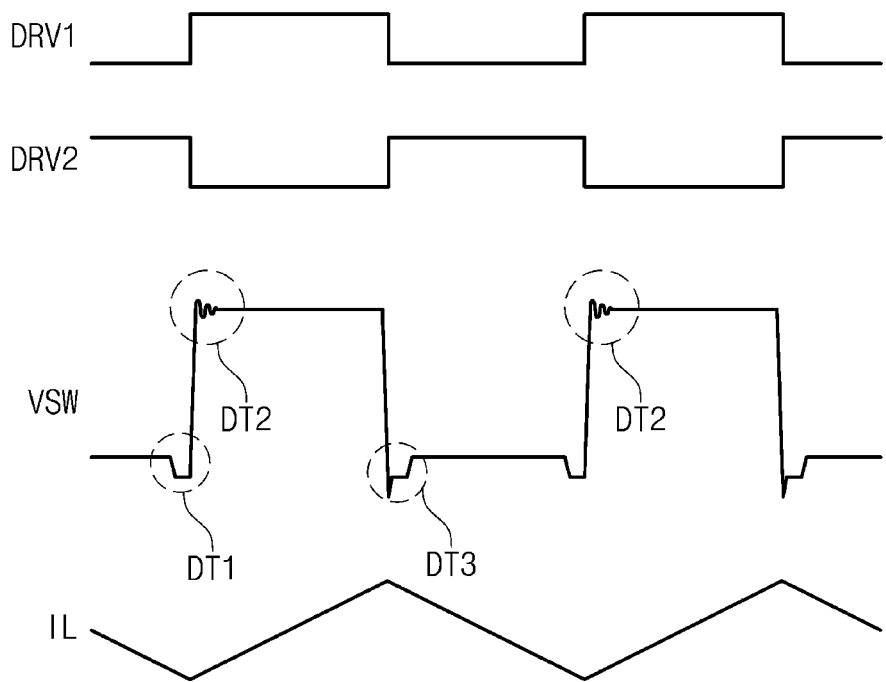
FIG. 7 illustrates examples of waveforms of voltages within a voltage converter of FIG. 6.

FIG. 7 is another waveform diagram illustrating selected signals and signal relationships associated with the voltage converter 100 of FIG. 6. Waveforms of the first gate driving signal GD1, second gate driving signal GD2, switch voltage VSW, and inductor current IL flowing through the inductor "L" are shown in FIG. 7.

As may be seen by a comparison of FIGS. 2 and FIG. 7, the second distortion DT2 may be substantially suppressed by the voltage converter 100, as compared with the performance of the voltage converter 10. Thus, certain embodiments of the inventive concept provide an embedded snubber ESNB associated with at least one transistor TR and implemented by connecting the damping resistor RDMP to the substrate terminal SUB of the transistor TR. Accordingly, it is unnecessary to separately provide a discrete snubber circuit, thereby reducing the physical size and implementation cost of the voltage converter. Also, the reliability of the voltage converter 100 may be improved and its useful lifetime extended by effectively suppressing distortions of the switch voltage VSW.

Figure 8:
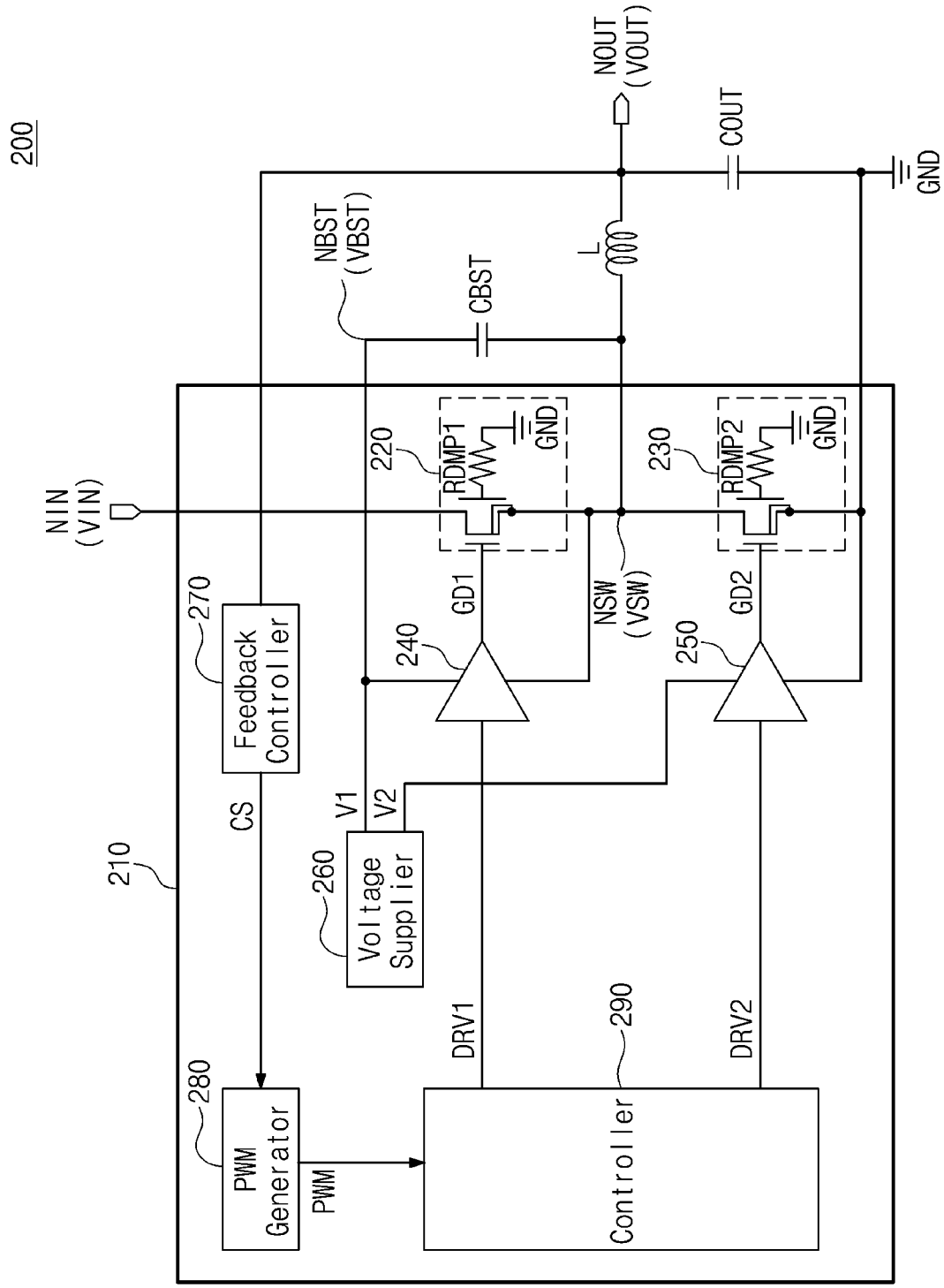
FIG. 8 illustrates a voltage converter according to another embodiment of the inventive concept.

FIG. 8 is another circuit diagram illustrating a voltage converter 200 according to embodiments of the inventive concept. Here again, analogous components are analogously labeled (1X0 verses 2X0) between the comparative embodiments of FIGS. 6 and 8.

Thus, the voltage converter 200 of FIG. 8 comprises a first transistor 220, a second transistor 230, a first driver 240, a second driver 250, a voltage supplier 260, a feedback controller 270, a pulse width modulation signal (PWM) generator 280, a controller 290, the inductor "L", the output capacitor COUT, and the boost capacitor CBST.

The configuration, connection and operation of the first driver 240, second driver 250, voltage supplier 260, feedback controller 270, PWM signal generator 280, controller 290, inductor "L", output capacitor COUT, and boost capacitor CBST may be the same as the configuration, connection and operation of the first driver 14, second driver 15, voltage supplier 16, feedback controller 17, PWM signal generator 18, controller 19, inductor "L", output capacitor COUT, and boost capacitor CBST as described with reference to FIG. 1.

Here again, a switch controller may be similarly configured to control operation of the first transistor 220 and/or the second transistor 230.

As described with reference to FIGS. 5 and 6, an embedded snubber ESNB may be implemented using the first transistor 220 and the first damping resistor RDMP1. Additionally, an embedded snubber ESNB may be implemented using the second transistor 230 and a second damping resistor RDMP2, where the substrate terminal SUB of the second transistor 230 is connected to a ground node through the second damping resistor RDMP2.

Using an embedded snubber implemented (e.g.,) using the second transistor 230 of FIG. 8, signal distortions associated with the second transistor 230, such as the first distortion DT1 and the third distortion DT3 described with reference to FIGS. 2 and 7, may be suppressed without escalating the physical size and/or the implementation costs of the voltage converter 200.

Figure 9:
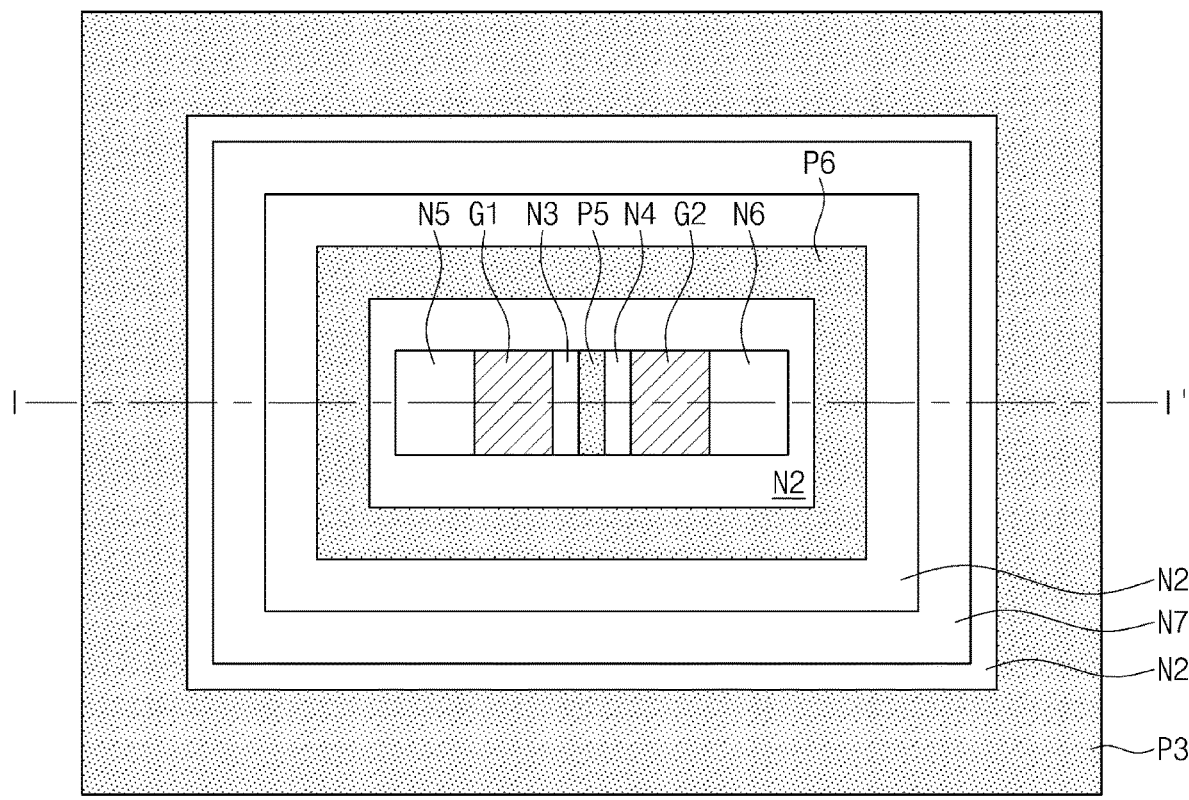
FIG. 9 illustrates an exemplary plan view of a transistor of FIG. 4 or 5, which is able to be used as a first transistor or a second transistor.
Figure 10:
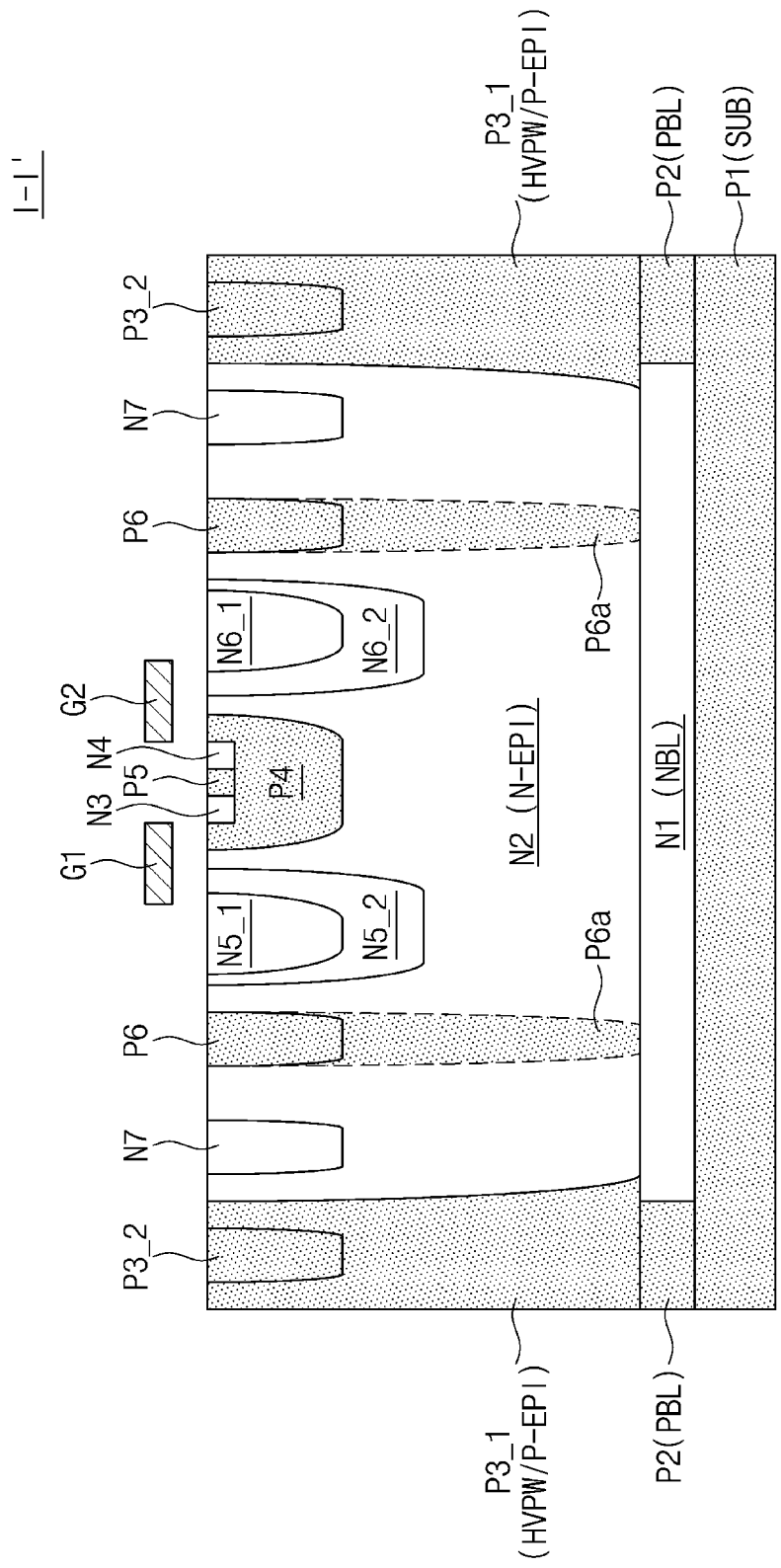
FIG. 10 is a cross-sectional view taken along a line I-I' of FIG. 9.

FIG. 9 is a top down diagram (or plan view) illustrating in one example a transistor TRa that may be used as the transistor TR described in relation to FIGS. 4 and 5. Thus, the transistor TRa may be used as the first transistor 120 or 220 and/or the second transistor 130 or 230 described in the foregoing embodiments. FIG. 10 is a cross-sectional view taken along a line I-I' of FIG. 9.

Referring to FIGS. 9 and 10, a first P-type area P1 may be provided as a substrate. A first N-type area N1 may be formed in the first P-type area P1. The first N-type area N1 may be an N-type buried layer NBL. A second P-type area P2 may be formed in the first P-type area P1 so as to surround the first N-type area Ni. The second P-type area P2 may be a P-type buried layer PBL.

A third P-type area P3 may be formed in the first P-type area P1 and on the first N-type area N1 and the second P-type area P2. The third P-type area P3 may include a 3_1-th P-type area P3_1 and a 3_2-th P-type area P3_2. The 3_1-th P-type area P3_1 may be a high voltage P-well or a P epitaxial layer. The 3_2-th P-type area P3_2 may be connected to a substrate terminal.

A second N-type area N2 may be formed in the 3_1-th P-type area P3_1. The second N-type area N2 may be an N epitaxial layer or an N-well. A first gate G1 and a second gate G2 may be provided over the second N-type area N2. The first gate G1 and the second gate G2 may be electrically separated from the second N-type area N2.

A fourth P-type area P4 may be formed in the second N-type area N2 between the first gate G1 and the second gate G2. The fourth P-type area P4 may be a P-type body. A third N-type area N3 and a fourth N-type area N4 may be formed in the fourth P-type area P4. The third N-type area N3 and the fourth N-type area N4 may be connected with a source terminal or a drain terminal.

A fifth P-type area P5 may be formed in the fourth P-type area P4 between the third N-type area N3 and the fourth N-type area N4. The fifth P-type area P5 may be connected to a body terminal. A fifth N-type area N5 and a sixth N-type area N6 may be formed in the second N-type area N2, with the fourth P-type area P4 interposed therebetween.

The fifth N-type area N5 may include a 5_1-th N-type area N5_1 and a 5_2-th N-type area N5_2. The 5_1-th N-type area N5_1 may be connected to a drain terminal or a source terminal. The 5_2-th N-type area N5_2 may be an N-type drift area. The sixth N-type area N6 may include a 6_1-th N-type area N6_1 and a 6_2-th N-type area N6_2. The 6_1-th N-type area N6_1 may be connected to a drain terminal or a source terminal. The 6_2-th N-type area N6_2 may be an N-type drift area.

A sixth P-type area P6 that surrounds the third to sixth N-type areas N3 to N6 and the fourth and fifth P-type areas P4 and P5 may be formed in the second N-type area N2. The sixth P-type area P6 may be a P-type guard ring. The sixth P-type area P6 may be biased by a ground voltage. A 6a-th P-type area P6a may be selectively formed in the second N-type area N2 and under the sixth P-type area P6. The 6a-th P-type area P6a may be a high voltage P-well.

A seventh N-type area N7 that surrounds the sixth P-type area P6 may be formed in the second N-type area N2. The seventh N-type area N7 may be an N-type guard ring. The seventh N-type area N7 may be biased by the ground voltage. The second N-type area N2 may also be biased by the ground voltage through the seventh N-type area N7.

Referring collectively to FIGS. 5, 9, and 10, the fifth N-type area N5 and the sixth N-type area N6 may correspond to the source terminal "S" or the drain terminal "D" of the transistor TR. The first P-type area P1 may correspond to the substrate terminal SUB. The capacitance apparent between the fifth N-type area N5 and the first P-type area P1 and/or the capacitance apparent between the sixth N-type area N6 and the first P-type area P1 may be opportunistically utilized as the first parasitic capacitor CPAR1 and/or the second parasitic capacitor CPAR2 described above.

The third N-type area N3 and the fourth N-type area N4 may correspond to the drain terminal "D" or the source terminal "S". The first P-type area P1 may correspond to the substrate terminal SUB. The capacitance apparent between the third N-type area N3 and the first P-type area P1 and/or the capacitance between the fourth N-type area N4 and the first P-type area P1 may be opportunistically utilized as the first parasitic capacitor CPAR1 or the second parasitic capacitor CPAR2 described above.

Thus an embedded snubber ESNB may be implemented in relation to the transistor TR by connecting the damping resistor RDMP apparent between the 3_2-th P-type area P3_2 and the ground node. In one particular embodiment, the 3_2-th P-type area P3_2 may be connected to a metal layer and may be routed to a resistor on any other active area through the metal layer. In another particular embodiment, the transistor TR may be an N-lateral, double diffusion metal oxide silicon (NLDMOS) transistor.

Figure 11:
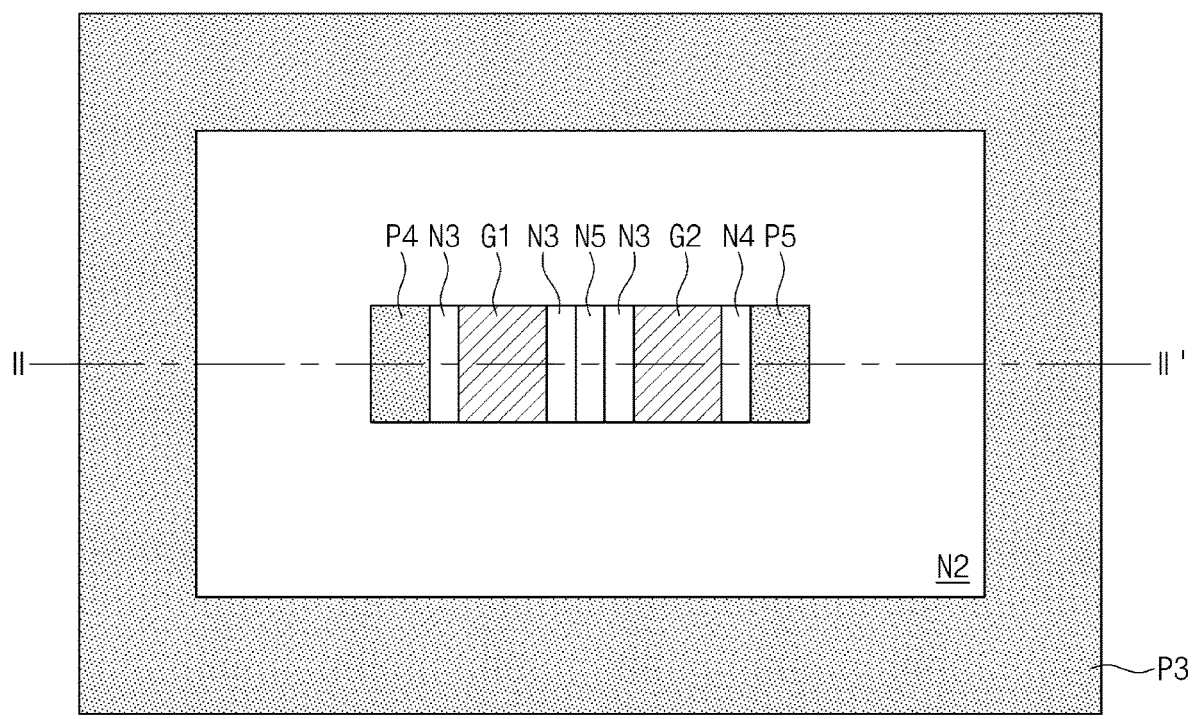
FIG. 11 illustrates an exemplary plan view of a transistor of FIG. 4 or 5, which is able to be used as a first transistor or a second transistor.
Figure 12:
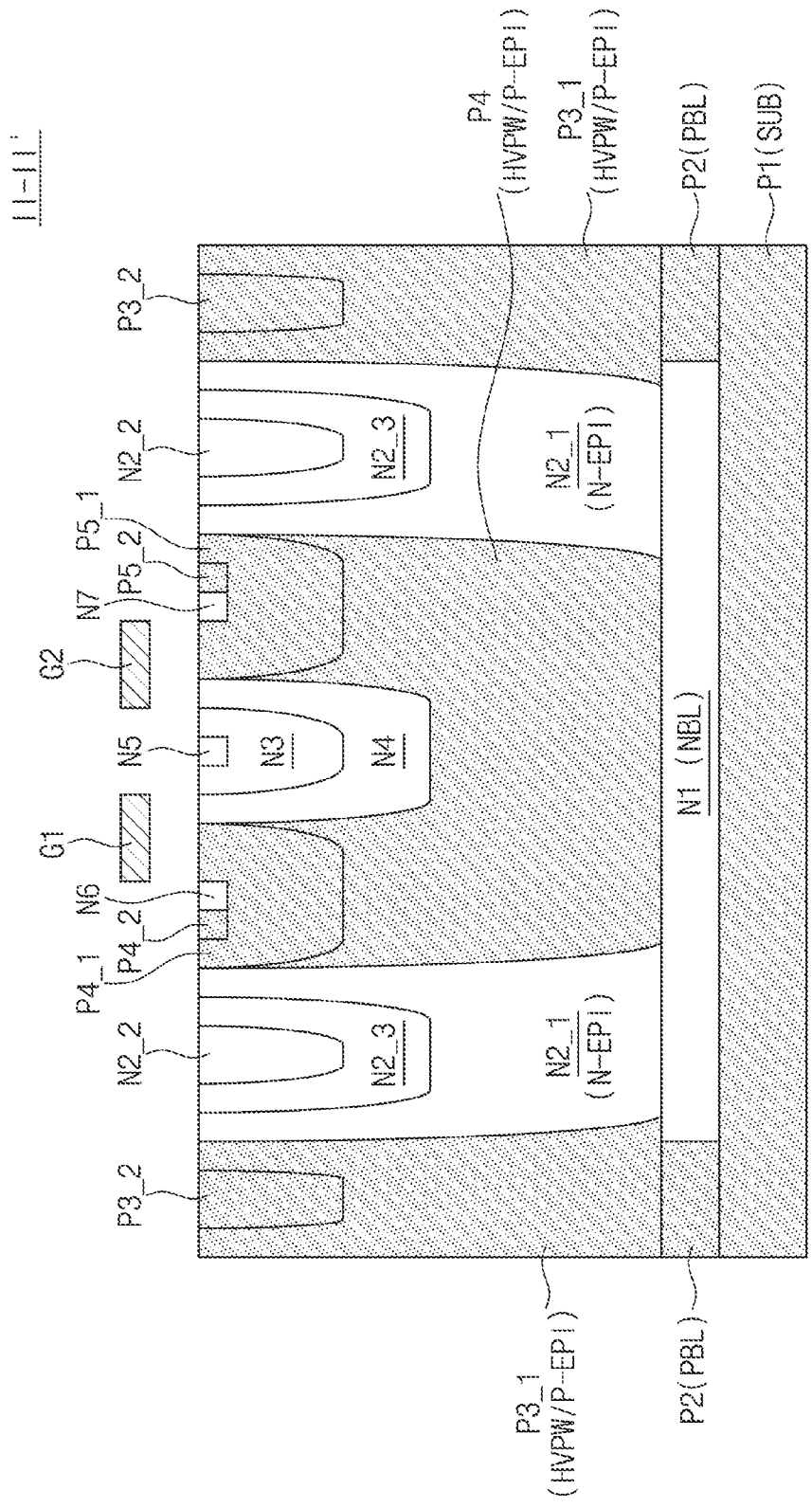
FIG. 12 is a cross-sectional view taken along a line II-II' of FIG. 11.

FIG. 11 is another plan view illustrating in another example a transistor TRb that may be used as the transistor TR described in relation to FIGS. 4 and 5. Thus, the transistor TRb, like transistor TRa, may be used as the first transistor 120 or 220 and/or the second transistor 130 or 230 described in the foregoing embodiments. FIG. 12 is a cross-sectional view taken along a line II-II' of FIG. 11.

Referring to FIGS. 11 and 12, a first P-type area P1 may again be used as a substrate. A first N-type area N1 may be formed in the first P-type area P1. The first N-type area N1 may be an N-type buried layer NBL, and a second P-type area P2 may be formed in the first P-type area P1 so as to surround the first N-type area N1. Thus, the second P-type area P2 may be a P-type buried layer PBL.

A third P-type area P3 may be formed in the first P-type area P1 and on the first N-type area N1 and the second P-type area P2. The third P-type area P3 may include a 3_1-th P-type area P3_1 and a 3_2-th P-type area P3_2. The 3_1-th P-type area P3_1 may be a high voltage P-well or a P epitaxial layer. The 3_2-th P-type area P3_2 may be connected to a substrate terminal.

A second N-type area N2 may be formed in the 3_1-th P-type area P3_1. The second N-type area N2 may include a 2_1-th N-type area N2_1, a 2_2-th N-type area N2_2, and a 2_3-th N-type area N2_3. The 2_1-th N-type area N2_1 may be an N epitaxial layer or an N-well. The 2_2-th N-type area N2_2 may be a guard ring. The 2_2-th N-type area N2_2 may be biased by the ground voltage. The 2_3-th N-type area N2_3 may be an N-type drift area that is formed under the 2_2-th N-type area N2_2.

A fourth P-type area P4 may be formed in the 2_1-th N-type area N2_1. The fourth P-type area P4 may be a high voltage P-well or a P-epitaxial layer. A first gate G1 and a second gate G2 may be provided over the fourth P-type area P4. The first gate G1 and the second gate G2 may be electrically separated from the fourth P-type area P4.

A third N-type area N3 may be formed in the fourth P-type area P4 between the first gate G1 and the second gate G2. A fourth N-type area N4 may be formed under the third N-type area N3. The fourth N-type area N4 may be an N-type drift area. A fifth N-type area N5 may be formed in the third N-type area N3. The fifth N-type area N5 may be connected to a source terminal or a drain terminal.

As shown generally in FIG. 11, the fifth N-type area N5 may be formed between the fourth P-type area P4 and a fifth P-type area P5 The fourth P-type area P4 may include a 4_1-th P-type area P4_1 and a 4_2-th P-type area P4_2 formed in the 4_1-th P-type area P4_1.

The 4_1-th P-type area P4_1 may be a P-type body. The 4_2-th P-type area P4_2 may be connected to a body terminal. A sixth N-type area N6 may be formed in the 4_1-th P-type area P4_1. The sixth N-type area N6 may be connected to a drain terminal or a source terminal.

The fifth P-type area P5 may include a 5_1-th P-type area P5_1 and a 5_2-th P-type area P5_2 formed in the 5_1-th P-type area P5_1. The 5_1-th P-type area P5_1 may be a P-type body. The 5_2-th P-type area P5_2 may be connected to a body terminal. A seventh N-type area N7 may be formed in the 5_1-th P-type area P5_1. The seventh N-type area N7 may be connected to a drain terminal or a source terminal.

Referring collectively to FIGS. 5, 11, and 12, the fifth N-type area N5 may correspond to the source terminal "S" or the drain terminal "D" of the transistor TR. The first P-type area P1 may correspond to the substrate terminal SUB. The capacitance apparent between the fifth N-type area N5 and the first P-type area P1 and/or between the sixth N-type area N6 and the first P-type area P1 may be opportunistically utilized as the first parasitic capacitor CPAR1 and/or the second parasitic capacitor CPAR2 described above.

The sixth N-type area N6 and the seventh N-type area N7 may correspond to the drain terminal "D" or the source terminal "S". The first P-type area P1 may correspond to the substrate terminal SUB. The capacitance apparent between the sixth N-type area N6 and the first P-type area P1 and/or between the seventh N-type area N7 and the first P-type area P1 may be opportunistically utilized as the first parasitic capacitor CPAR1 and/or the second parasitic capacitor CPAR2 described above.

Thus, the embedded snubber ESNB may be implemented in relation to the transistor TR by connecting the damping resistor RDMP apparent between the 3_2-th P-type area P3_2 and the ground node. In one particular embodiment, the 3_2-th P-type area P3_2 may be connected to a metal layer and may be routed to a resistor on any other active area through the metal layer. In another particular embodiment, the transistor TR may be an isolated N-lateral, double diffusion metal oxide silicon (NLDMOS) transistor.

Figure 13:
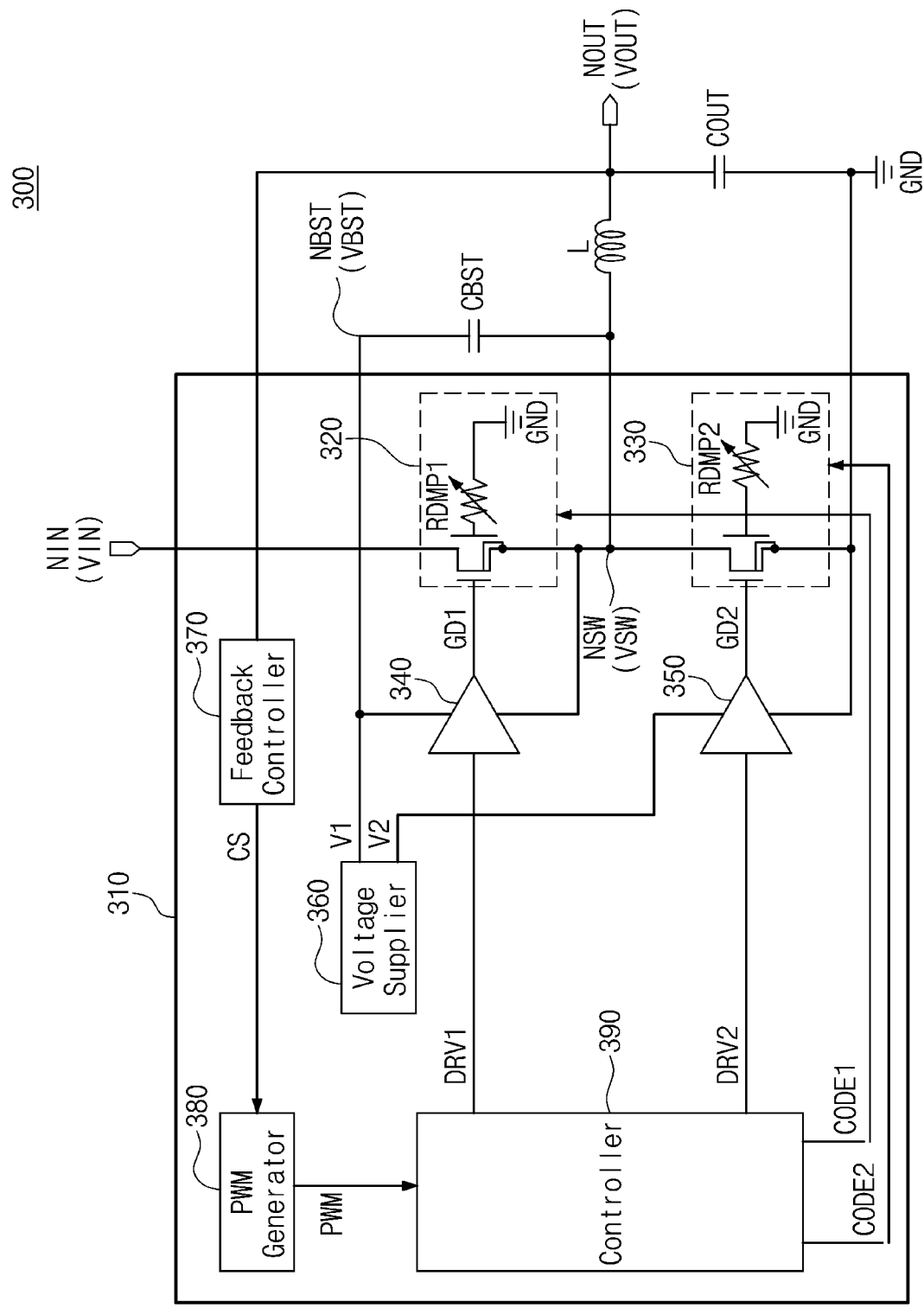
FIG. 13 illustrates a voltage converter according to another embodiment of the inventive concept.

FIG. 13 is another circuit diagram illustrating a voltage converter 300 according to embodiments of the inventive concept. Here again, analogous components are analogously labeled (1X verses 3X0) between the comparative embodiments of FIGS. 1 and 13.

Thus, the voltage converter 300 of FIG. 13 comprises a first transistor 320, a second transistor 330, a first driver 340, a second driver 350, a voltage supplier 360, a feedback controller 370, a PWM signal generator 380, a controller 390, an inductor "L", an output capacitor COUT, and a boost capacitor CBST.

The configuration, connection and operation of the first driver 340, second driver 350, voltage supplier 360, feedback controller 370, PWM signal generator 380, controller 390, inductor "L", output capacitor COUT, and boost capacitor CBST may be the same as the configuration, connection and operation of the first driver 14, second driver 15, voltage supplier 16, feedback controller 17, PWM signal generator 18, controller 19, inductor "L", output capacitor COUT, and boost capacitor CBST described with reference to FIG. 1.

Here again, a switch controller may be similarly configured to control operation of the first transistor 320 and/or the second transistor 330.

As described with reference to FIG. 8, a substrate terminal of the first transistor 320 may be connected to the first damping resistor RDMP1, and a substrate terminal of the second transistor 330 may be connected to the second damping resistor RDMP2. However, in the illustrated embodiment of FIG. 13, the first damping resistor RDMP1 may be a variable resistor, and the second damping resistor RDMP2 may also be a variable resistor.

In this regard the controller 390 may be configured to generate a first code CODE1 and a second code CODE2 for adjusting the respective resistance value(s) of the first damping resistor RDMP1 and the second damping resistor RDMP2.

Figure 14:
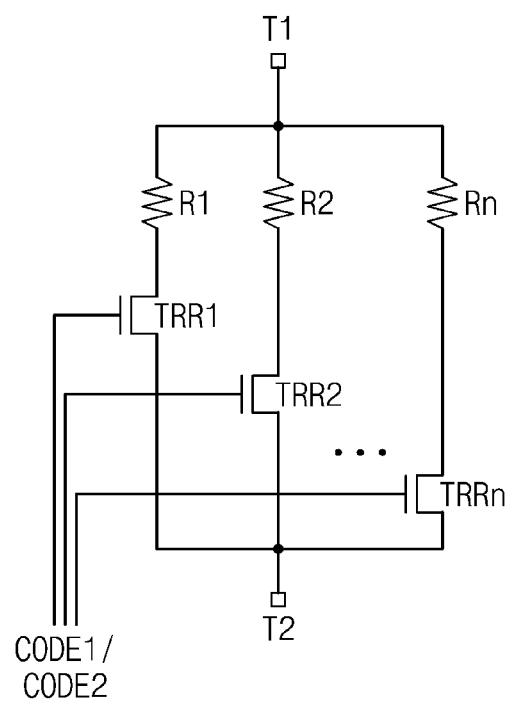
FIG. 14 illustrates an example of a variable resistor which is able to be used as a first damping resistor or a second damping resistor.

FIG. 14 is a circuit diagram illustrating in one example a variable resistor that may be used as the first damping resistor RDMP1 or the second damping resistor RDMP2. Referring to FIGS. 13 and 14, a variable resistor RDMP1/RDMP2 may include first to n-th resistors R1 to Rn as well as first to n-th resistance transistors TRR1 to TRRn.

Each of the first to n-th resistors R1 to Rn may be paired with a corresponding transistor of the first to n-th resistance transistors TRR1 to TRRn. In each pair, a resistor and a transistor may be connected in series. Connected pairs of resistors and transistors may be selectively connected in parallel between a first terminal T1 and a second terminal T2 using the first code CODE1 and the second code CODE2.

Here, one or both of the first terminal T1 and the second terminal T2 may be connected to the ground node or the substrate node. Thus, when a specific transistor is turned ON, a resistance value of a resistor paired with the specific transistor is applied to the damping resistor RDMP1/RDMP2. When a specific transistor is turned OFF, a resistance value of a resistor paired with the specific transistor is not applied to the damping resistor RDMP1/RDMP2.

A resistance value of the damping resistor RDMP1/RDMP2 may be adjusted by controlling the first to n-th resistance transistors TRR1 to TRRn using the first and second codes CODE1/CODE2, and the degree to which target harmonics are suppressed by the embedded snubber may be adjusted in accordance with Equation 2 above.

In certain embodiments, with reference to FIG. 2, the second damping resistor RDMP2 need not always be provided to the second transistor 330 of the voltage converter 300.

Figure 15:
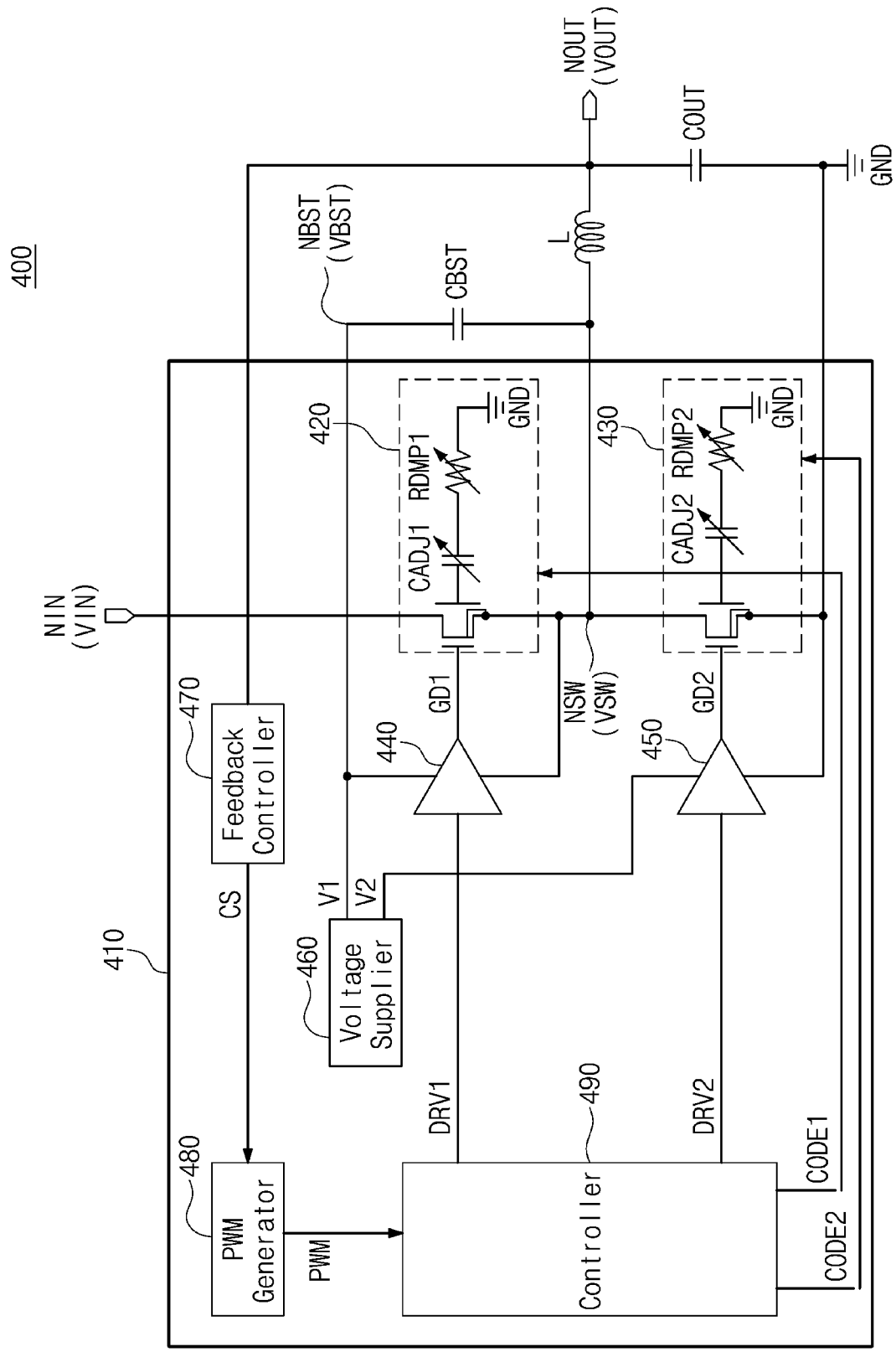
FIG. 15 illustrates a voltage converter according to another embodiment of the inventive concept.

FIG. 15 is another circuit diagram illustrating a voltage converter 400 according to embodiments of the inventive concept. Here again, analogous components are analogously labeled (3X0 verses 4X0) between the comparative embodiments of FIGS. 13 and 15.

Thus, the voltage converter 400 of FIG. 15 comprises analogous components in relation to the voltage converter 300 of FIG. 13. However, a first transistor 420 in the voltage converter 400 includes not only a variable first damping resistor RDMP1, but also a first adjustment capacitor CADJ1. Similarly, a second transistor 430 in the voltage converter 400 includes not only a variable second damping resistor RDMP2, but also a second adjustment capacitor DADJ2.

In FIG. 15, a substrate terminal of the first transistor 420 may be connected to a ground node through the first adjustment capacitor CADJ1 and the first damping resistor RDMP1. The first adjustment capacitor CADJ1 may be a variable capacitor. The first damping resistor RDMP1 may include a variable resistor.

Likewise, a substrate terminal of the second transistor 430 may be connected to the ground node through a second adjustment capacitor CADJ2 and the second damping resistor RDMP2. The second adjustment capacitor CADJ2 may be a variable capacitor. The second damping resistor RDMP2 may include a variable resistor.

The controller 490 may be used to generate a first code CODE1 for adjusting the capacitance of the first adjustment capacitor CADJ1 and/or the resistance value of the first damping resistor RDMP1. The controller 490 may also be used to generate the second code CODE2 for adjusting the capacitance of the second adjustment capacitor CADJ2 and/or the resistance value of the second damping resistor RDMP2.

Figure 16:
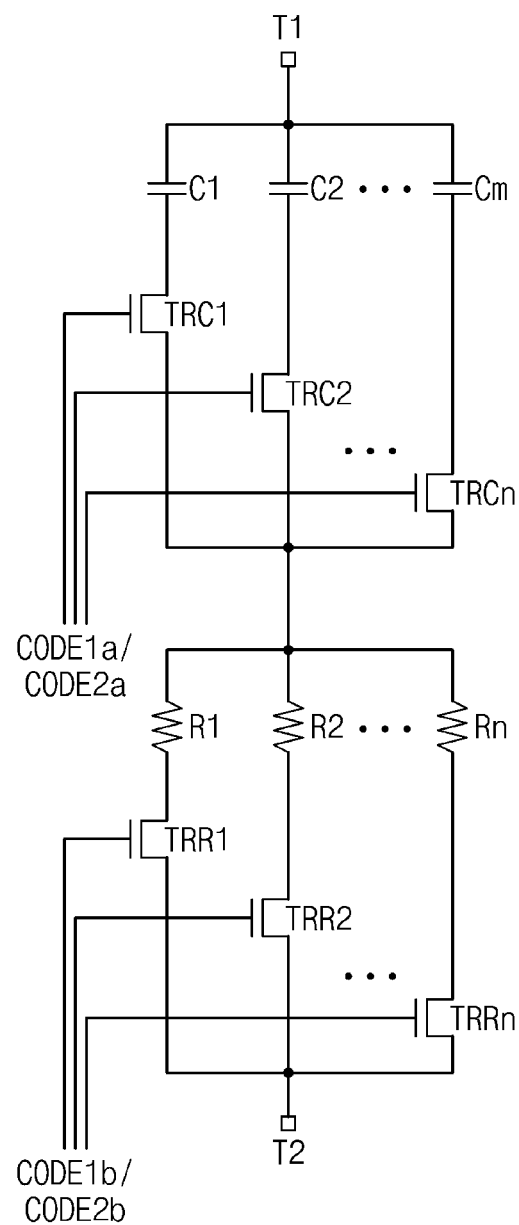
FIG. 16 illustrates an example of a variable capacitor and a variable resistor which are able to be used as a first adjustment capacitor and a first damping resistor or a second damping resistor.

FIG. 16 is a circuit diagram illustrating one example of a variable capacitor VC and a variable resistor VR that may be used to implement the first adjustment capacitor CADJ1 and/or the second adjustment capacitor CADJ2, as well as first damping resistor RDMP1 and/or the second damping resistor RDMP2.

Referring to FIGS. 15 and 16, the variable capacitor VC may include first to m-th capacitors C1 to Cm and first to m-th capacitance transistors TRC1 to TRCm. Each of the first to m-th capacitors C1 to Cm may be paired (e.g., series connected) with a corresponding transistor of the first to m-th capacitance transistors TRC1 to TRCm. Connected-pairs of capacitors and transistors may be selectively connected in parallel between the first terminal T1 and the variable resistor VR. Thus, the variable resistor VR may include first to n-th resistors R1 to Rn and first to n-th resistance transistors TRR1 to TRRn. The variable resistor VR that is connected between the variable capacitor VC and the second terminal T2 may be configured to be the same as described with reference to FIG. 14. substrate node. The first to m-th capacitance transistors TRC1 to TRCm may be controlled by a corresponding code CODE1$a$ of the code CODE1 or a corresponding code CODE2$a$ of the code CODE2. The first to n-th resistance transistors TRR1 to TRRn may be controlled by a corresponding code CODE1$b$ of the code CODE1 or a corresponding code CODE2$b$ of the code CODE2.

When a specific capacitance transistor is turned ON, the capacitance of a corresponding capacitor paired with the specific capacitance transistor may be applied to capacitances of the first and second parasitic capacitors CPAR1 and CPAR2. Alternately, when a specific capacitance transistor is turned OFF, the capacitance of a corresponding capacitor paired with the specific capacitance transistor is not applied to the first and second parasitic capacitors CPAR1 and CPAR2.

In this manner, for example, the capacitance associated with the first transistor 420 and/or the second transistor 430 may be adjusted by controlling the first to m-th capacitance transistors TRC1 to TRCm using the code CODE1$a$/CODE2$a$. Accordingly, a center frequency of the harmonics to-be-suppressed may be adjusted in relation to the Equation 1 above. Also, consistent with Equation 2 above, adjustment of the capacitance(s) may control the degree to which the harmonics are suppressed.

As described above with reference to FIGS. 15 and 16, the first adjustment capacitor CADJ1 and/or the second adjustment capacitor CADJ2 may be provided in any one of the foregoing embodiments as a variable capacitor. Alternately, the first adjustment capacitor CADJ1 and/or the second adjustment capacitor CADJ2 may be implemented as a fixed capacitor having a fixed capacitance.

Figure 17:
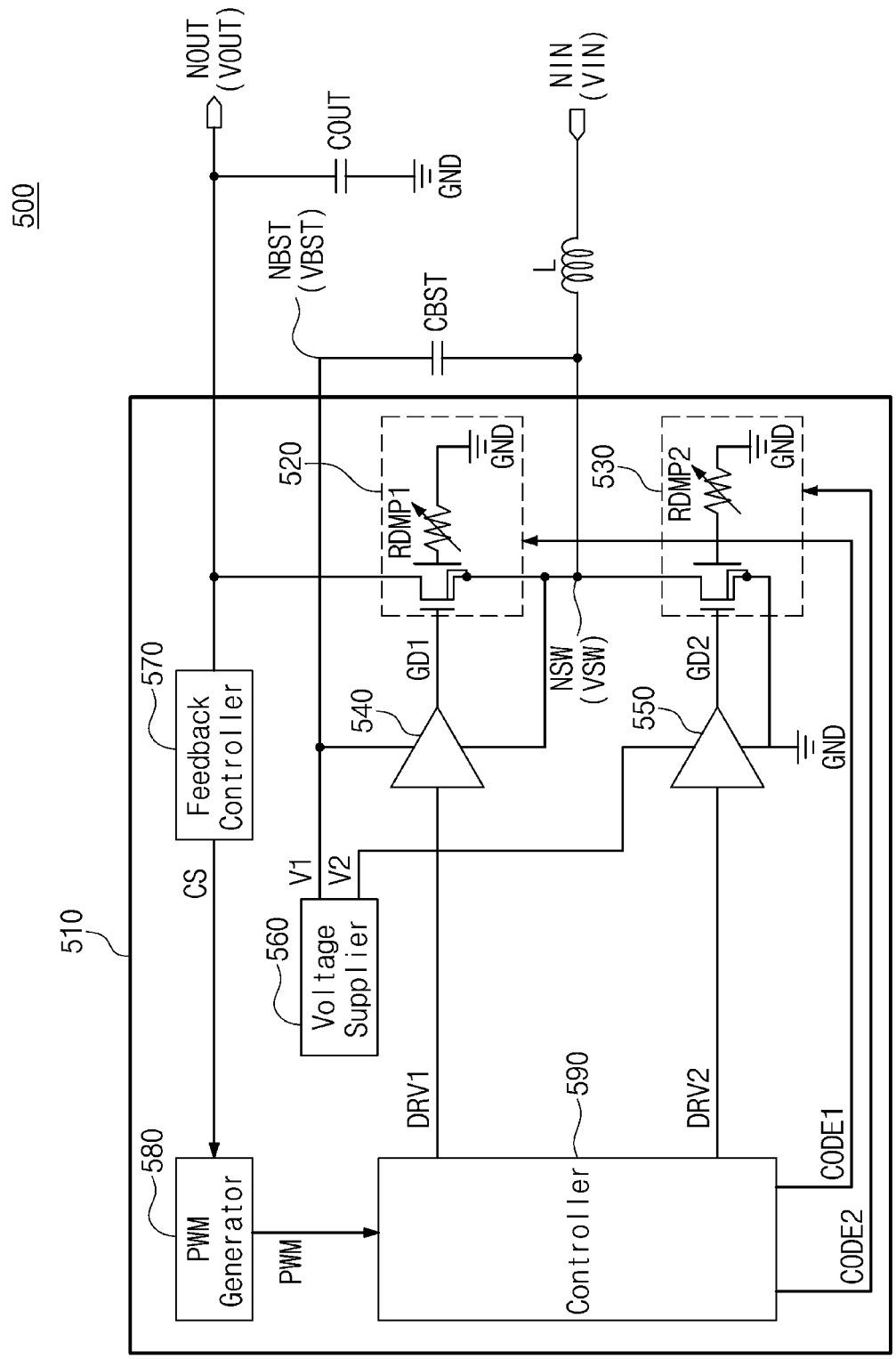
FIG. 17 illustrates a voltage converter according to another embodiment of the inventive concept.

FIG. 17 is another circuit diagram illustrating a voltage converter 500 according to embodiments of the inventive concept. Here again, analogous components are analogously labeled (3X0 verses 5X0) between the comparative embodiments of FIGS. 13 and 17.

Here, the embodiment of FIG. 13 is extended by reconfiguring (or re-positioning) the output node NOUT, where analogous components are analogously labeled (3XX verses 5XX) between the comparative embodiments of FIGS. 13 and 17.

In the embodiment of FIG. 17, a first transistor 520 is connected between the output node NOUT at which the output voltage VOUT is apparent and the boost capacitor CBST, and a second transistor 530 is connected between the switch node NSW and a ground node. The boost capacitor CBST is connected between the switch node NSW and a connection node between the voltage supplier 560 and the first driver 540. The inductor "L" is connected between the input voltage VIN at which the input voltage VIN is apparent and the switch node NSW, and the output capacitor COUT is connected between the output node NOUT and the ground node.

Thus, the voltage converter 500 of FIG. 17 may be a boost converter capable of stepping up the input voltage VIN in order to generate the output voltage VOUT.

Consistent with the description above made with reference to FIG. 8, a substrate terminal of the first transistor 520 may be connected to the ground node through the first damping resistor RDMP1, and a substrate terminal of the second transistor 530 may be connected to the ground node through the second damping resistor RDMP2. Here again, the first damping resistor RDMP1 and the second damping resistor RDMP2 may have a fixed resistance value or variable resistance value.

The controller 590 may be configured to generate the first code CODE1 and the second code CODE2 for adjusting the respective resistance value(s) of the first damping resistor RDMP1 and the second damping resistor RDMP2.

In certain embodiments consistent with the description of FIG. 15, a substrate terminal of each of the first transistor 520 and the second transistor 530 may be connected to the ground node through an adjustment capacitor and a damping resistor. The adjustment capacitor may have a fixed capacitance value or a variable capacitance value.

In certain embodiments consistent with the description of FIG. 6, the second damping resistor RDMP2 may not be provided to the second transistor 530, and at least one of the first damping resistor RDMP1 and the second damping resistor RDMP2 may have a fixed resistance value.

Here again, a switch controller may be configured as described above to control the operation of the first transistor 520 and/or the second transistor 530.

As described above, a voltage converter according to an embodiment of the inventive concept may incorporate an embedded snubber SNB that is provided or implemented using the parasitic capacitor of a transistor. Such voltage converters enjoy improved reliability and an extended operating lifetime without increasing the physical size and implementation costs of the voltage converter.

As described above, components of the voltage converter 10, 20, 100, 200, 300, 400, or 500 are described above using the such terms as "first", "second", "third", and the like. However, these descriptive terms are used to distinguish respective components and signal and do not numerically limit embodiments of the inventive concept to only the number and arrangement of the illustrated components.

In the above embodiments, various components may be implemented as blocks, where respective blocks may be implemented using hardware (e.g., integrated circuit(s) (IC), application specific IC (ASCI), field programmable gate arrays (FPGA), and complex programmable logic device (CPLD)), firmware driven by one or more hardware devices, software such as an application, or a combination of a hardware device and software. Also, the blocks may include circuits or intellectual property (IP) implemented with semiconductor elements in an integrated circuit.

According to the inventive concept, a voltage converter may be provided that effectively suppresses harmonics with the use of an embedded snubber. While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A voltage converter comprising:
   an inductor connected between an output node at which an output voltage is apparent and a switch node;
   an output capacitor connected between the output node and a ground node;
   a first transistor connected between an input node receiving an input voltage and the switch node;
   a second transistor connected between the switch node and the ground node; and
   a switch controller configured to control operation of the first transistor and the second transistor,
   wherein the first transistor comprises
      a first source/drain area, a second source/drain area and a first body area over a substrate,
      a first gate terminal connected to the switch controller,
      a first source/drain terminal connected to the input node,
      a second source/drain terminal connected to the switch node, and
      a first body terminal connected to the switch node,
   wherein the substrate includes a first substrate terminal connected to the ground node through a first embedded snubber including a first damping resistor.

2. The voltage converter of claim 1, wherein the first transistor is one of an N-type transistor and a P-type transistor.

3. The voltage converter of claim 1, wherein the first embedded snubber further includes at least one of a first parasitic capacitance apparent between the first substrate terminal and the first source/drain terminal of the first transistor, and a second parasitic capacitance apparent between the first substrate terminal and the second source/drain terminal of the first transistor.

4. The voltage converter of claim 3, wherein the first damping resistor includes a variable resistor.

5. The voltage converter of claim 4, wherein the switch controller is configured to generate a plurality of codes applied to the first embedded snubber to vary a resistance value of the variable resistor.

6. The voltage converter of claim 4, wherein the first embedded snubber further includes a first capacitor connected in series with the first damping resistor between the first substrate terminal and the ground node.

7. The voltage converter of claim 6, wherein the first capacitor includes a variable capacitor.

8. The voltage converter of claim 7, wherein the switch controller is configured to generate a plurality of codes applied to the first embedded snubber to vary a capacitance value of the variable capacitor.

9. The voltage converter of claim 1, wherein the second transistor comprises:

a third source/drain area, a fourth source/drain area and a second body area over the substrate;
a second gate terminal connected to the switch controller;
a third source/drain terminal connected to the switch node;
a fourth source/drain terminal connected to the ground node;
a second body terminal connected to the ground node; and
a second substrate terminal connected to the ground node through a second embedded snubber including a second damping resistor.

10. The voltage converter of claim 9, wherein the second embedded snubber further includes at least one of a first parasitic capacitance apparent between the second substrate terminal and the third source/drain terminal of the second transistor, and a second parasitic capacitance apparent between the second substrate terminal and the fourth source/drain terminal of the second transistor.

11. The voltage converter of claim 10, wherein the second damping resistor includes a variable resistor.

12. The voltage converter of claim 11, wherein the switch controller is configured to generate a plurality of codes applied to the second embedded snubber to vary a resistance value of the variable resistor.

13. The voltage converter of claim 12, wherein the second embedded snubber further includes a second capacitor connected in series with the second damping resistor between the second substrate terminal and the ground node.

14. The voltage converter of claim 13, wherein the second capacitor includes a variable capacitor.

15. The voltage converter of claim 14, wherein the switch controller is configured to generate a second plurality of codes applied to the second embedded snubber to vary a capacitance value of the variable capacitor.

16. A voltage converter configured to convert an input voltage to an output voltage using an inductor connected between an input node receiving the input voltage and a switch node, and an output capacitor connected between an output node at which the output voltage is apparent and a ground node, the voltage converter comprising:
a switch controller configured to control operation of a first transistor and a second transistor to generate the output voltage from the input voltage while suppressing harmonics generated by the operation of the first transistor and the second transistor,
wherein the first transistor is connected between the switch node and the output node, and the second transistor is connected between the switch node and the ground node,
wherein the first transistor is disposed over a substrate, and
the first transistor comprises
a first source/drain area, a second source/drain area, and a first body area in a well region,
a first gate terminal connected to the switch controller,
a first source/drain terminal connected to the output node,
a second source/drain terminal connected to the switch node, and
a first body terminal connected to the switch node,
wherein the substrate includes a first substrate terminal connected to the ground node through a first embedded snubber including a first damping resistor.

17. The voltage converter of claim 16, wherein the voltage converter is a step up voltage converter that steps up the input voltage to generate the output voltage.

18. The voltage converter of claim 16, wherein the first embedded snubber further includes a first capacitor connected in series with the first damping resistor between the first substrate terminal and the ground node.

19. The voltage converter of claim 18, wherein the second transistor comprises:
a third source/drain area, a fourth source/drain area and a second body area in a second well region;
a second gate terminal connected to the switch controller;
a third source/drain terminal connected to the switch node;
a fourth source/drain terminal connected to the ground node;
a second body terminal connected to the ground node; and
a second substrate terminal connected to the ground node through a second embedded snubber including a second damping resistor and a second capacitor connected in series between the second substrate terminal and the ground node.

20. A voltage converter comprising:
an inductor connected between an output node at which an output voltage is apparent and a switch node;
an output capacitor connected between the output node and a ground node;
a first transistor connected between an input node receiving an input voltage and the switch node;
a second transistor connected between the switch node and the ground node; and
a switch controller configured to control operation of the first transistor and the second transistor,
wherein the first transistor comprises
a first gate terminal connected to the switch controller, a first source/drain terminal connected to the input node, a second source/drain terminal connected to the switch node, a first body terminal connected to the switch node, and a first substrate terminal connected to the ground node through a first embedded snubber including a first damping resistor, and
a P-type substrate connected to the first substrate terminal, an N-type well formed in the P-type substrate and connected to the ground node, a P-type body formed in the N-type well and connected to the first body terminal, a gate formed over the P-type body and connected to the first gate terminal, and a first N-type area and a second N-type area formed adjacent to the P-type body and respectively connected to the first source/drain terminal and the second source/drain terminal.

* * * * *